(12) United States Patent
Yamamoto

(10) Patent No.: US 12,021,267 B2
(45) Date of Patent: Jun. 25, 2024

(54) BATTERY AND METHOD OF MANUFACTURING SAME

(71) Applicant: Prime Planet Energy & Solutions, Inc., Tokyo (JP)

(72) Inventor: Shota Yamamoto, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 75 days.

(21) Appl. No.: 17/551,200

(22) Filed: Dec. 15, 2021

(65) Prior Publication Data

US 2022/0200105 A1 Jun. 23, 2022

(30) Foreign Application Priority Data

Dec. 21, 2020 (JP) ................. 2020-211206

(51) Int. Cl.
*H01M 50/531* (2021.01)
*H01M 50/547* (2021.01)
*H01M 50/566* (2021.01)

(52) U.S. Cl.
CPC ....... *H01M 50/531* (2021.01); *H01M 50/547* (2021.01); *H01M 50/566* (2021.01)

(58) Field of Classification Search
CPC . H01M 50/531; H01M 50/547; H01M 50/566
See application file for complete search history.

(56) References Cited

U.S. PATENT DOCUMENTS

| 2013/0224536 A1* | 8/2013 | Hattori | H01M 50/562 |
| | | | 429/61 |
| 2014/0242439 A1 | 8/2014 | Hattori et al. | |
| 2014/0242440 A1* | 8/2014 | Yamada | H01M 50/176 |
| | | | 429/121 |
| 2019/0221791 A1 | 7/2019 | Wakimoto | |
| 2019/0363331 A1 | 11/2019 | Wakimoto et al. | |
| 2020/0274189 A1* | 8/2020 | Muroya | H01M 50/531 |
| 2021/0328311 A1* | 10/2021 | Wakimoto | H01M 50/531 |

FOREIGN PATENT DOCUMENTS

| CN | 110048065 A | 7/2019 |
| CN | 111599975 A | 8/2020 |
| JP | 2010277797 A | 12/2010 |

(Continued)

*Primary Examiner* — Matthew T Martin
*Assistant Examiner* — Taylor Harrison Krone
(74) *Attorney, Agent, or Firm* — HAUPTMAN HAM, LLP

(57) ABSTRACT

A terminal member includes a swaging-joined portion. An inner peripheral wall of the connection hole of the conductive member includes: a first region along an insertion direction of the terminal member; a tapered region located on the electrode assembly side with respect to the first region, the tapered region being a region in which a diameter of the connection hole is increased in a direction away from the first region; and a second region located between the first region and the tapered region. An intersection angle ($\theta 2$) of the second region with respect to the first region is larger than an intersection angle ($\theta 1$) of the tapered region with respect to the first region. A width of the second region along a radial direction of the connection hole is smaller than a width of the tapered region along the radial direction of the connection hole.

12 Claims, 7 Drawing Sheets

(56) References Cited

FOREIGN PATENT DOCUMENTS

| | | | |
|---|---|---|---|
| JP | 2013182724 | A | 9/2013 |
| JP | 2014165155 | A | 9/2014 |
| JP | 2015-060827 | A | 3/2015 |
| JP | 2015153521 | A | 8/2015 |
| JP | 2019125491 | A | 7/2019 |
| JP | 2020136105 | A | 8/2020 |
| WO | 2014/054733 | A1 | 4/2014 |
| WO | 2018139453 | A1 | 8/2018 |
| WO | 2018/159180 | A1 | 9/2018 |

\* cited by examiner

BATTERY AND METHOD OF MANUFACTURING SAME

This nonprovisional application is based on Japanese Patent Application No. 2020-211206 filed on Dec. 21, 2020, with the Japan Patent Office, the entire contents of which are hereby incorporated by reference.

BACKGROUND OF THE INVENTION

Field of the Invention

The present technology relates to a battery and a method of manufacturing the battery.

Description of the Background Art

Conventionally, there has been known a battery having a structure in which an electrode terminal and a current collector are joined by swaging. A battery having such a structure is described, for example, in Japanese Patent Laying-Open No. 2015-153521 (PTL 1) and Japanese Patent Laying-Open No. 2014-165155 (PTL 2).

In the structure in which the terminal member and the current collector are joined by swaging, it is required to improve strength of swaging between the terminal member and the current collector while suppressing a swaging step from being complicated and suppressing occurrence of other problems such as warpage of a member. The conventional structure is not necessarily sufficient in view of the above.

SUMMARY OF THE INVENTION

An object of the present technology is to provide: a battery in which fastening force for a terminal member is high; and a method of manufacturing the battery.

A battery according to the present technology includes: an electrode assembly; a battery case that accommodates the electrode assembly; a terminal member fixed to the battery case; and a conductive member accommodated in the battery case, the conductive member being provided with a connection hole into which the terminal member is inserted, the conductive member being electrically connected to the electrode assembly. The terminal member includes a swaging joined portion inserted in the connection hole and joined to the conductive member by swaging. An inner peripheral wall of the connection hole of the conductive member includes: a first region along an insertion direction of the terminal member; a tapered region located on the electrode assembly side with respect to the first region, the tapered region being a region in which a diameter of the connection hole is increased in a direction away from the first region; and a second region located between the first region and the tapered region. An intersection angle ($\theta 2$) of the second region with respect to the first region is larger than an intersection angle ($\theta 1$) of the tapered region with respect to the first region. A width of the second region along a radial direction of the connection hole is smaller than a width of the tapered region along the radial direction of the connection hole.

A method of manufacturing a battery according to the present technology includes: preparing a conductive member provided with a connection hole in which a terminal member is to be inserted; inserting the terminal member into the connection hole of the conductive member; joining the terminal member inserted in the connection hole, to the conductive member by swaging; electrically connecting an electrode assembly and the terminal member to each other via the conductive member by electrically connecting the conductive member and the electrode assembly to each other; and accommodating the electrode assembly and the conductive member in a battery case. An inner peripheral wall of the connection hole of the conductive member includes: a first region along an insertion direction of the terminal member; a tapered region located on the electrode assembly side with respect to the first region, the tapered region being a region in which a diameter of the connection hole is increased in a direction away from the first region; and a second region located between the first region and the tapered region. An intersection angle ($\theta 2$) of the second region with respect to the first region is larger than an intersection angle ($\theta 1$) of the tapered region with respect to the first region. A width of the second region along a radial direction of the connection hole is smaller than a width of the tapered region along the radial direction of the connection hole.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
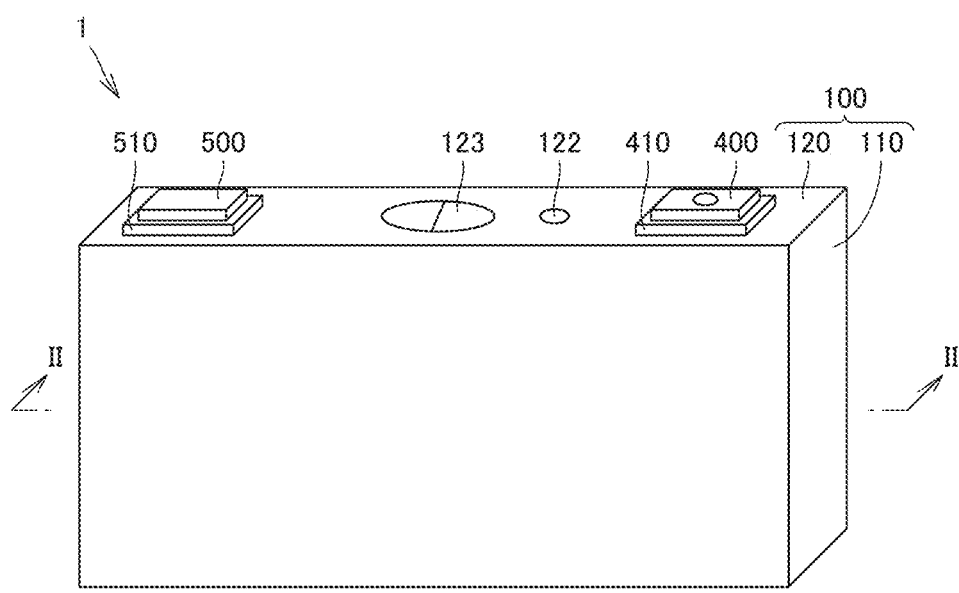
FIG. 1 is a perspective view of a prismatic secondary battery.

Hereinafter, embodiments of the present technology will be described. It should be noted that the same or corresponding portions are denoted by the same reference characters, and may not be described repeatedly.

It should be noted that in the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly.

It should be noted that in the present specification, the terms "comprise", "include", and "have" are open-end terms. That is, when a certain configuration is included, a configuration other than the foregoing configuration may or may not be included. Further, the present technology is not limited to one that necessarily exhibits all the functions and effects stated in the present embodiment.

In the present specification, the term "battery" is not limited to a lithium ion battery, and may include another battery such as a nickel-metal hydride battery. In the present specification, the term "electrode" may collectively represent a positive electrode and a negative electrode. Further, the term "electrode plate" may collectively represent a positive electrode plate and a negative electrode plate.

Figure 2:
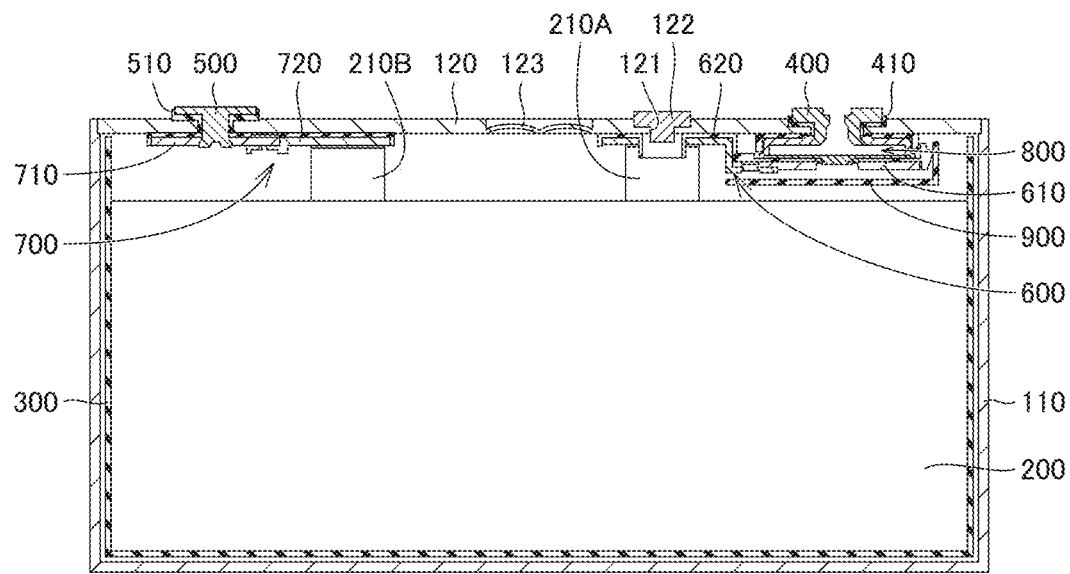
FIG. 2 is a cross sectional view taken along II-II in FIG. 1.

FIG. 1 is a perspective view of a prismatic secondary battery 1. FIG. 2 is a cross sectional view taken along II-II in FIG. 1.

As shown in FIGS. 1 and 2, prismatic secondary battery 1 includes a battery case 100, an electrode assembly 200, an insulating sheet 300, a positive electrode terminal 400, a negative electrode terminal 500, a positive electrode current collecting member 600, a negative electrode current collecting member 700, a current interrupting mechanism 800, and a cover member 900.

Battery case 100 is constituted of: a prismatic exterior body 110 that is provided with an opening and that has a prismatic tubular shape having a bottom; and a sealing plate 120 that seals the opening of prismatic exterior body 110. Each of prismatic exterior body 110 and sealing plate 120 is preferably composed of a metal, and is preferably composed of aluminum or an aluminum alloy.

Sealing plate 120 is provided with an electrolyte solution injection hole 121. After injecting an electrolyte solution into battery case 100 via electrolyte solution injection hole 121, electrolyte solution injection hole 121 is sealed by a sealing member 122. As sealing member 122, for example, a blind rivet or another metal member can be used.

Sealing plate 120 is provided with a gas discharge valve 123. Gas discharge valve 123 is fractured when pressure in battery case 100 becomes more than or equal to a predetermined value. Thus, gas in battery case 100 is discharged to outside of battery case 100.

Electrode assembly 200 is accommodated in battery case 100 together with the electrolyte solution. Electrode assembly 200 is formed by stacking positive electrode plates and negative electrode plates with separators being interposed therebetween. Insulating sheet 300, which is composed of a resin, is disposed between electrode assembly 200 and prismatic exterior body 110.

A positive electrode tab 210A and a negative electrode tab 210B are provided at an end portion of electrode assembly 200 on the sealing plate 120 side.

Positive electrode tab 210A and positive electrode terminal 400 are electrically connected to each other via positive electrode current collecting member 600. Positive electrode current collecting member 600 includes a first positive electrode current collector 610 and a second positive electrode current collector 620. It should be noted that positive electrode current collecting member 600 may be constituted of one component. Positive electrode current collecting member 600 is preferably composed of a metal, and is more preferably composed of aluminum or an aluminum alloy.

Negative electrode tab 210B and negative electrode terminal 500 are electrically connected to each other via negative electrode current collecting member 700. Negative electrode current collecting member 700 includes a first negative electrode current collector 710 and a second negative electrode current collector 720. It should be noted that negative electrode current collecting member 700 may be constituted of one component. Negative electrode current collecting member 700 is preferably composed of a metal, and is more preferably composed of copper or a copper alloy.

Positive electrode terminal 400 is fixed to sealing plate 120 with an outer side insulating member 410 being interposed therebetween, outer side insulating member 410 being composed of a resin. Negative electrode terminal 500 is fixed to sealing plate 120 with an outer side insulating member 510 being interposed therebetween, outer side insulating member 510 being composed of a resin.

Positive electrode terminal 400 is preferably composed of a metal, and is more preferably composed of aluminum or an aluminum alloy. Negative electrode terminal 500 is preferably composed of a metal, and is more preferably composed of copper or a copper alloy. Negative electrode terminal 500 may have: a region that is composed of copper or a copper alloy and that is disposed on the inner side of battery case 100; and a region that is composed of aluminum or an aluminum alloy and that is disposed on the outer side of battery case 100.

Current interrupting mechanism 800 is provided at a conductive path between positive electrode tab 210A (positive electrode plate) and positive electrode terminal 400. Current interrupting mechanism 800 is operated to interrupt the conductive path when pressure inside battery case 100 becomes more than or equal to a predetermined value. The working pressure of gas discharge valve 123 is set to a value larger than the working pressure of current interrupting mechanism 800. Current interrupting mechanism 800 can be provided at a conductive path between negative electrode tab 210B and negative electrode terminal 500.

Figure 3:
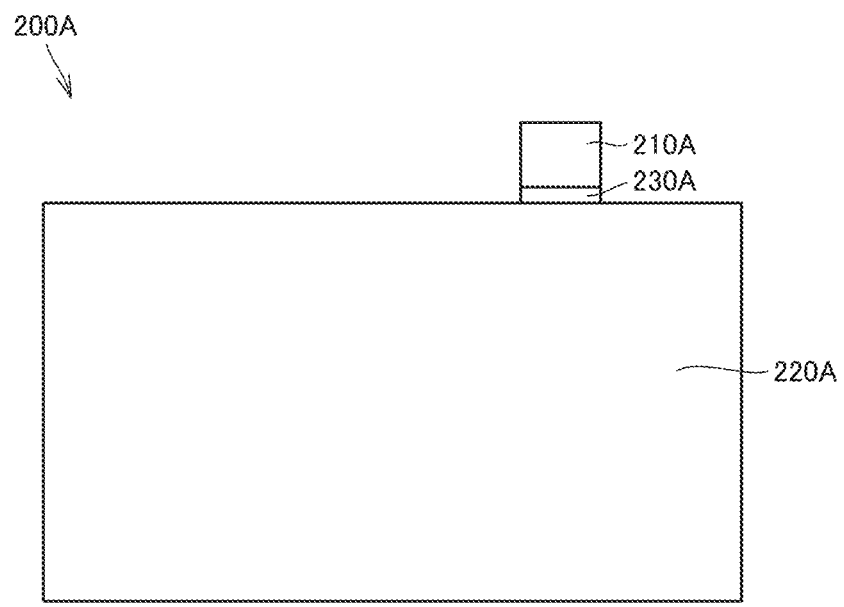
FIG. 3 is a plan view of a positive electrode plate included in an electrode assembly.

FIG. 3 is a plan view of positive electrode plate 200A included in electrode assembly 200. Positive electrode plate 200A has a main body 220A in which a positive electrode active material composite layer is formed on each of both surfaces of a positive electrode core body constituted of an aluminum foil having a quadrangular shape, the positive electrode active material composite layer including a positive electrode active material (for example, lithium nickel cobalt manganese composite oxide or the like), a binder (polyvinylidene difluoride (PVdF) or the like), and a conductive material (for example, a carbon material or the like). The positive electrode core body protrudes from an end side of the main body portion, and the positive electrode core body thus protruding constitutes positive electrode tab 210A. A positive electrode protection layer 230A including alumina particles, a binder, and a conductive material is provided on positive electrode tab 210A at a portion adjacent to main body 220A. Positive electrode protection layer 230A has an electric resistance larger than that of the positive electrode active material composite layer. The positive electrode active material composite layer may include no conductive material. Positive electrode protection layer 230A may not be necessarily provided.

Figure 4:
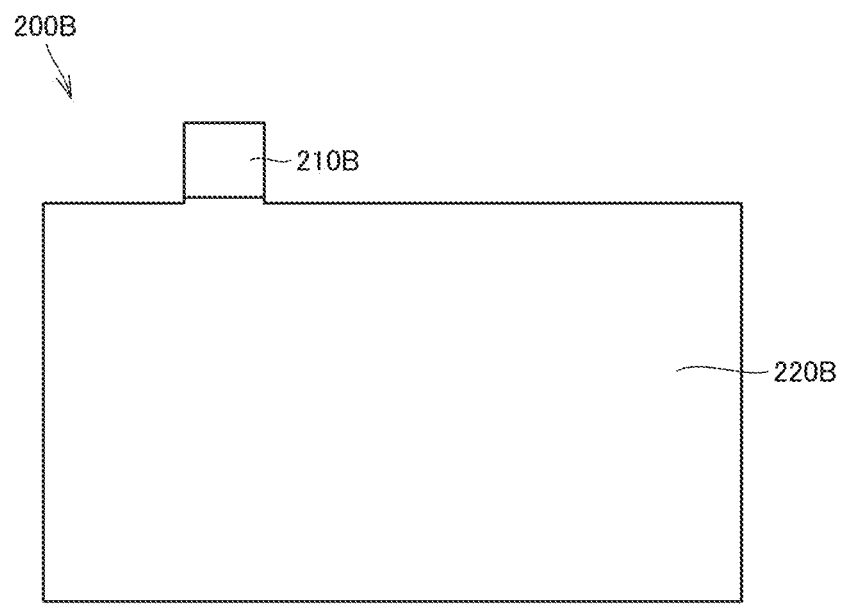
FIG. 4 is a plan view of a negative electrode plate included in the electrode assembly.

FIG. 4 is a plan view of negative electrode plate 200B included in electrode assembly 200. Negative electrode plate 200B has a main body 220B in which a negative electrode active material layer is formed on each of both surfaces of a negative electrode core body constituted of a copper foil having a quadrangular shape. The negative electrode core body protrudes from an end side of main body 220B, and the negative electrode core body thus protruding constitutes negative electrode tab 210B.

Figure 5:
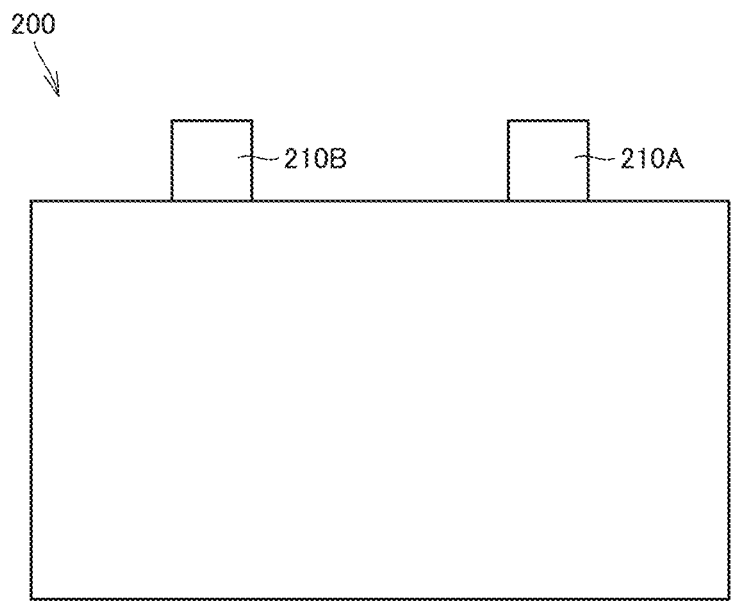
FIG. 5 is a plan view showing the electrode assembly including the positive electrode plate and the negative electrode plate.

FIG. 5 is a plan view showing electrode assembly 200 including positive electrode plates 200A and negative electrode plates 200B. As shown in FIG. 5, electrode assembly 200 is produced such that positive electrode tabs 210A of positive electrode plates 200A are stacked and negative electrode tabs 210B of negative electrode plates 200B are stacked at one end portion of electrode assembly 200. For example, approximately 50 positive electrode plates 200A and approximately 50 negative electrode plates 200B are stacked. Positive electrode plates 200A and negative electrode plates 200B are alternately stacked with separators being interposed therebetween, each of the separators being composed of polyolefin, each of the separators having a quadrangular shape. It should be noted that a long separator may be used with the separator being folded in a meandering manner.

Figure 6:
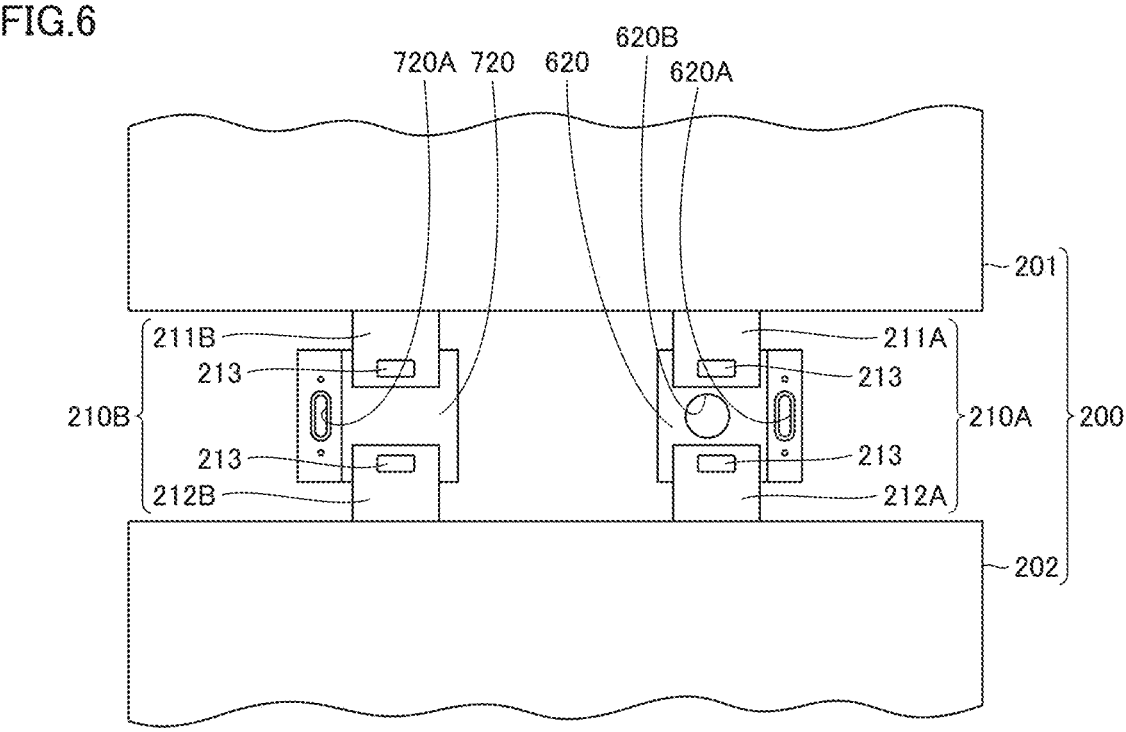
FIG. 6 is a diagram showing a structure of connection between the electrode assembly and each of a positive electrode current collecting member and a negative electrode current collecting member.

FIG. 6 is a diagram showing a structure of connection between electrode assembly 200 and each of positive electrode current collecting member 600 and negative electrode current collecting member 700. As shown in FIG. 6, electrode assembly 200 includes a first electrode assembly element 201 (first stack group) and a second electrode assembly element 202 (second stack group). Separators are also disposed on the respective outer surfaces of first electrode assembly element 201 and second electrode assembly element 202. First electrode assembly element 201 and second electrode assembly element 202 can be fixed in a stacked state by a tape or the like, for example. Alternatively, an adhesive layer may be provided on each of positive electrode plates 200A, negative electrode plates 200B, and the separators to adhere the separators and positive electrode plates 200A and to adhere the separators and negative electrode plates 200B.

The plurality of positive electrode tabs 210A of first electrode assembly element 201 constitute a first positive electrode tab group 211A. The plurality of negative electrode tabs 210B of first electrode assembly element 201 constitute a first negative electrode tab group 211B. The plurality of positive electrode tabs 210A of second electrode assembly element 202 constitute a second positive electrode tab group 212A. The plurality of negative electrode tabs 210B of second electrode assembly element 202 constitute a second negative electrode tab group 212B.

Second positive electrode current collector 620 and second negative electrode current collector 720 are disposed between first electrode assembly element 201 and second electrode assembly element 202. Second positive electrode current collector 620 is provided with a first opening 620A and a second opening 620B. First positive electrode tab group 211A and second positive electrode tab group 212A are connected onto second positive electrode current collector 620 by welding, thereby forming welded connection portions 213. First negative electrode tab group 211B and second negative electrode tab group 212B are connected onto second negative electrode current collector 720 by welding, thereby forming welded connection portions 213. Welded connection portions 213 can be formed by, for example, ultrasonic welding, resistance welding, laser welding, or the like.

Figure 7:
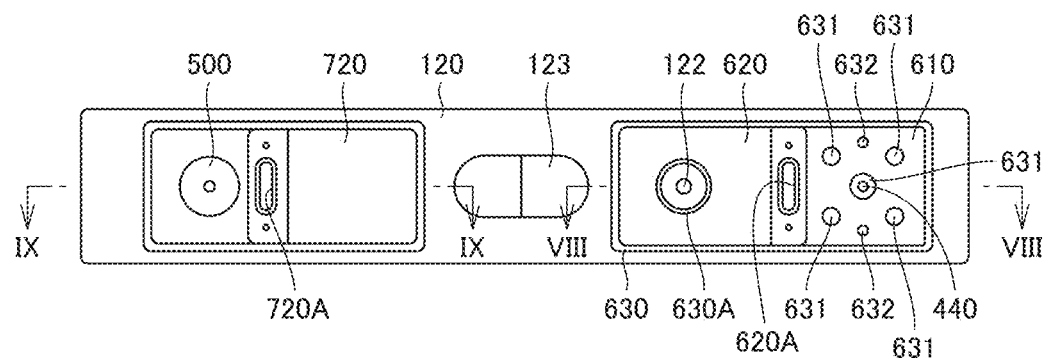
FIG. 7 is a diagram showing a structure of attaching of the positive electrode current collecting member and the negative electrode current collecting member on a sealing plate.
Figure 8:
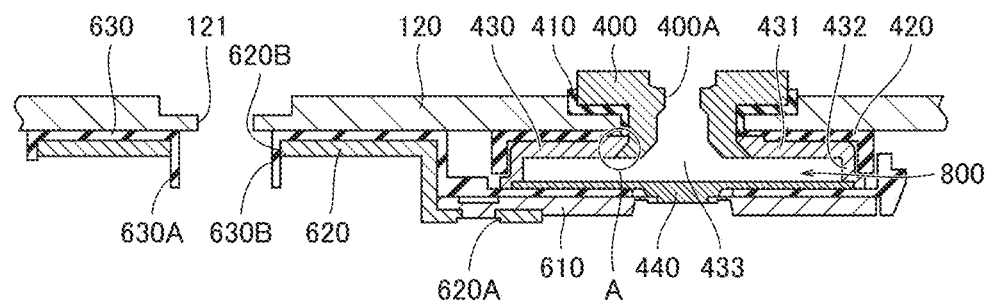
FIG. 8 is a cross sectional view taken along VIII-VIII in FIG. 7.
Figure 9:
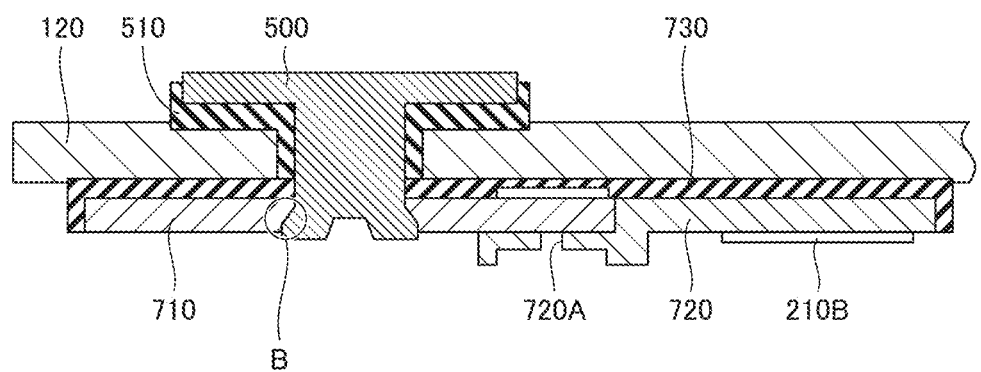
FIG. 9 is a cross sectional view taken along IX-IX in FIG. 7.

FIG. 7 is a diagram showing a structure of attaching of positive electrode current collecting member 600 and negative electrode current collecting member 700 on sealing plate 120. FIG. 8 shows a cross section taken along VIII-VIII in FIG. 7. FIG. 9 shows a cross section taken along IX-IX in FIG. 7.

First, the following describes attaching of positive electrode current collecting member 600 on sealing plate 120 with reference to FIGS. 7 and 8.

Outer side insulating member 410 composed of a resin is disposed on the outer surface side of sealing plate 120. An insulating member 420 composed of a resin and a conductive member 430 are disposed on the inner surface side of sealing plate 120. Thereafter, positive electrode terminal 400 is inserted into a through hole of outer side insulating member 410, a positive electrode terminal attachment hole of sealing plate 120, a through hole of insulating member 420, and a through hole of conductive member 430. Then, the tip of positive electrode terminal 400 is connected onto conductive member 430 by swaging. Thus, positive electrode terminal 400, outer side insulating member 410, sealing plate 120, insulating member 420, and conductive member 430 are fixed. The portions of positive electrode terminal 400 and conductive member 430 connected to each other by the swaging are preferably welded by laser welding or the like.

Conductive member 430 has: a conductive member base portion 431; and a columnar portion 432 extending from an edge portion of conductive member base portion 431 toward electrode assembly 200 (lower side in the figure). An opening 433 is provided at an end portion of columnar portion 432 on the electrode assembly 200 side. It should be noted that positive electrode terminal 400 and conductive member 430 may be provided as an integrated member.

A deformable plate 440 is disposed to close opening 433 of conductive member 430. The peripheral edge of deformable plate 440 is welded to conductive member 430 by laser welding or the like. Thus, opening 433 of conductive member 430 is sealed by deformable plate 440. It should be noted that each of conductive member 430 and deformable plate 440 is preferably composed of a metal, and is more preferably composed of aluminum or an aluminum alloy.

A protrusion provided at an insulating member 630 (positive electrode current collector holder) composed of a resin is inserted into the through hole provided in first positive electrode current collector 610, and the diameter of the tip of the protrusion is increased by heat swaging or the like, with the result that a connection portion 631 can be formed to connect first positive electrode current collector 610 and insulating member 630 to each other. Further, a displacement prevention portion 632 can be formed by inserting the protrusion provided at insulating member 630 into a through hole provided in first positive electrode current collector 610.

Insulating member 630 connected to first positive electrode current collector 610 and insulating member 420 on the positive electrode terminal 400 side are connected to each other by fitting. It should be noted that insulating member 630 can be provided with a claw, and can be connected thereto by hooking the claw onto insulating member 420.

Thereafter, in the opening provided in insulating member 630, first positive electrode current collector 610 on the positive electrode current collecting member 600 side and the central portion of deformable plate 440 on the positive electrode terminal 400 side are connected to each other by laser welding or the like. Preferably, a connection hole is provided in first positive electrode current collector 610, and an edge portion of the connection hole is connected to deformable plate 440 by welding.

As shown in FIG. 8, insulating member 630 has a tubular portion 630A that protrudes on the electrode assembly 200 side. Tubular portion 630A extends through second opening 620B of second positive electrode current collector 620 and defines a hole portion 630B that communicates with electrolyte solution injection hole 121.

When attaching positive electrode current collecting member 600 on sealing plate 120, first positive electrode current collector 610 is first connected to insulating member 630 on sealing plate 120. Then, second positive electrode current collector 620 connected to electrode assembly 200 is attached to first positive electrode current collector 610. On this occasion, second positive electrode current collector 620 is disposed on insulating member 630 such that a portion of second positive electrode current collector 620 overlaps with first positive electrode current collector 610. Then, the circumference around first opening 620A provided in second positive electrode current collector 620 is welded to first positive electrode current collector 610 by laser welding or the like.

Next, the following describes attaching of negative electrode current collecting member 700 on sealing plate 120 with reference to FIGS. 7 and 9.

Outer side insulating member 510 composed of a resin is disposed on the outer surface side of sealing plate 120. First negative electrode current collector 710 and insulating member 730 (negative electrode current collector holder) composed of a resin are disposed on the inner surface side of sealing plate 120. Next, negative electrode terminal 500 is inserted into a through hole of outer side insulating member 510, a negative electrode terminal attachment hole of sealing plate 120, a through hole of first negative electrode current collector 710, and a through hole of insulating member 730. Then, the tip of negative electrode terminal 500 is connected onto first negative electrode current collector 710 by swaging. Thus, negative electrode terminal 500, outer side insulating member 510, sealing plate 120, first negative electrode current collector 710, and insulating member 730 are fixed. It should be noted that the portions of negative electrode terminal 500 and first negative electrode current collector 710 connected to each other by the swaging are preferably welded by laser welding or the like.

Further, second negative electrode current collector 720 is disposed on insulating member 730 such that a portion of second negative electrode current collector 720 overlaps with first negative electrode current collector 710. In first opening 720A provided in second negative electrode current collector 720, second negative electrode current collector 720 is welded to first negative electrode current collector 710 by laser welding or the like.

When attaching negative electrode current collecting member 700 on sealing plate 120, first negative electrode current collector 710 is first disposed on insulating member 730 provided on sealing plate 120. Then, second negative electrode current collector 720 connected to electrode assembly 200 is attached to first negative electrode current collector 710. On this occasion, second negative electrode current collector 720 is disposed on insulating member 730 such that a portion of second negative electrode current collector 720 overlaps with first negative electrode current collector 710. Then, the circumference around first opening 720A provided in second negative electrode current collector 720 is welded to first negative electrode current collector 710 by laser welding or the like.

The following describes an operation of current interrupting mechanism 800 shown in FIG. 8. When pressure inside battery case 100 is increased, the central portion of deformable plate 440 is deformed to move toward the sealing plate 120 side. When the pressure inside battery case 100 then becomes more than or equal to a predetermined value, the welded joined portions of first positive electrode current collector 610 and deformable plate 440 are raptured in response to the deformation of deformable plate 440. Thus, the conductive path from positive electrode plate 200A to positive electrode terminal 400 is disconnected.

When prismatic secondary battery 1 is brought into an overcharged state to result in increased pressure inside battery case 100, current interrupting mechanism 800 is operated to disconnect the conductive path from positive electrode plate 200A to positive electrode terminal 400, thereby preventing further progress of the overcharging.

A through hole 400A is formed in positive electrode terminal 400. By supplying gas to the inner side with respect to conductive member 430 via through hole 400A, leak inspection can be performed for the welded connection portions of conductive member 430 and deformable plate 440. Through hole 400A is sealed by a terminal sealing member composed of a resin or a metal.

Figure 10:
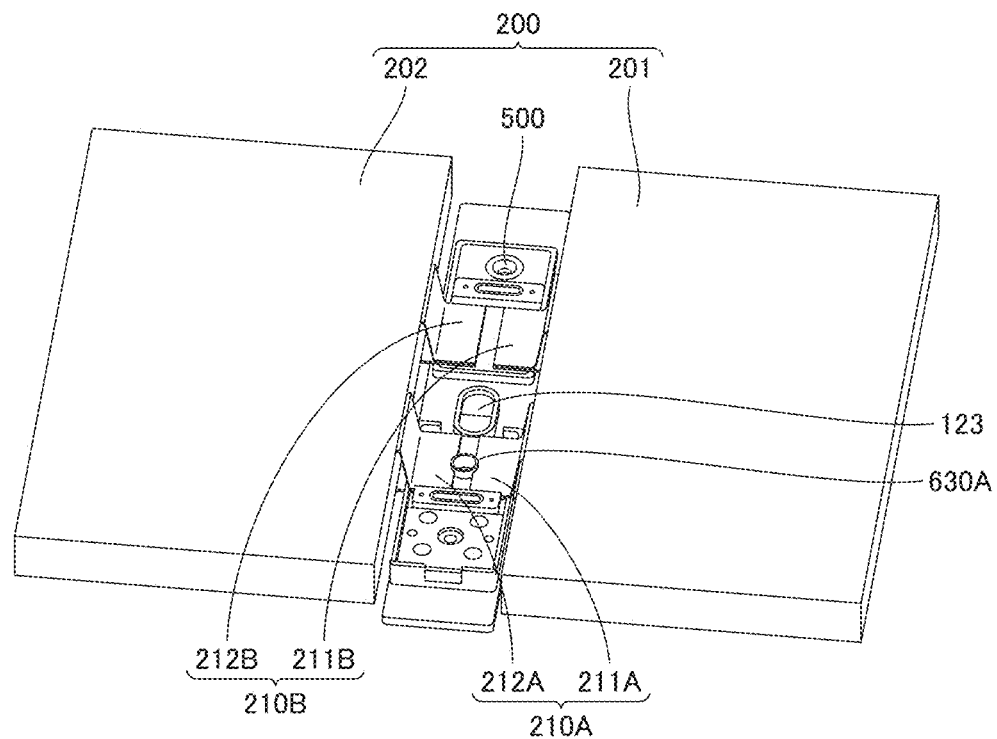
FIG. 10 is a diagram showing a state in which the sealing plate and the electrode assembly are connected to each other.
Figure 11:
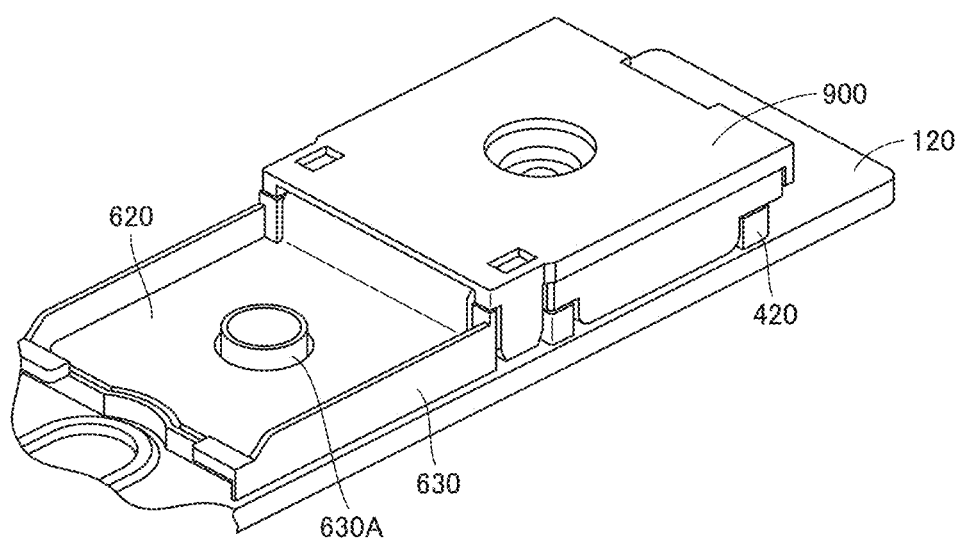
FIG. 11 is an enlarged view of surroundings of the positive electrode current collecting member in the state in which the sealing plate and the electrode assembly are connected to each other.

FIG. 10 is a diagram showing a state in which sealing plate 120 and electrode assembly 200 are connected to each other. FIG. 11 is an enlarged view of surroundings of positive electrode current collecting member 600 in the state in which sealing plate 120 and electrode assembly 200 are connected to each other.

As described with reference to FIGS. 7 to 9, first electrode assembly element 201 and second electrode assembly element 202 are attached to sealing plate 120 with positive electrode current collecting member 600 and negative electrode current collecting member 700 being interposed therebetween. Thus, as shown in FIG. 10, first electrode assembly element 201 and second electrode assembly element 202 are connected to sealing plate 120, thereby electrically connecting electrode assembly 200 to positive electrode terminal 400 and negative electrode terminal 500.

As shown in FIG. 11, cover member 900 composed of a resin is provided on first positive electrode current collector 610. Cover member 900 is located between first positive electrode current collector 610 and electrode assembly 200. Cover member 900 may be provided on the negative electrode current collector side. Further, cover member 900 is not an essential member, and can be omitted as appropriate.

From the state shown in FIG. 10, first electrode assembly element 201 and second electrode assembly element 202 are stacked on each other. On this occasion, first positive electrode tab group 211A and second positive electrode tab group 212A are curved in different directions. First negative electrode tab group 211B and second negative electrode tab group 212B are curved in different directions.

First electrode assembly element 201 and second electrode assembly element 202 can be stacked on each other by a tape or the like. Alternatively, first electrode assembly element 201 and second electrode assembly element 202 can be stacked on each other by placing them in an insulating sheet formed in the form of a box or a pouch. Further, first electrode assembly element 201 and second electrode assembly element 202 can be fixed by adhesion.

First electrode assembly element 201 and second electrode assembly element 202 stacked on each other are enclosed with an insulating sheet and are inserted into prismatic exterior body 110. Thereafter, sealing plate 120 is welded to prismatic exterior body 110 to seal the opening of prismatic exterior body 110 by sealing plate 120, thereby forming sealed battery case 100.

Thereafter, a non-aqueous electrolyte solution is injected into battery case 100 through electrolyte solution injection hole 121 provided in sealing plate 120. Examples of the non-aqueous electrolyte solution usable herein include a non-aqueous electrolyte solution in which $LiPF_6$ is dissolved at a concentration of 1.2 mol/L in a non-aqueous solvent in which ethylene carbonate (EC), ethyl methyl carbonate (EMC), and diethyl carbonate (DEC) are mixed at a volume ratio (25° C.) of 30:30:40.

After injecting the non-aqueous electrolyte, electrolyte solution injection hole 121 is sealed by sealing member 122. By performing the above steps, prismatic secondary battery 1 is completed.

Figure 12:
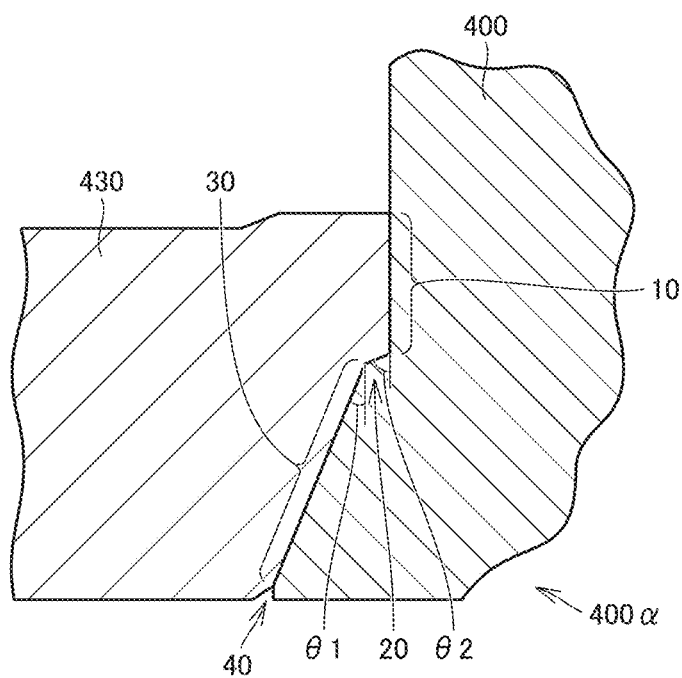
FIG. 12 is an enlarged view of a swaging joined portion (portion A in FIG. 8) of a positive electrode terminal to a conductive member.

FIG. 12 is an enlarged view of a swaging joined portion (portion A in FIG. 8) of positive electrode terminal 400 to conductive member 430. As shown in FIG. 12, positive electrode terminal 400 (terminal member) includes a swaging joined portion 400a that is inserted in the hole (connection hole) formed in conductive member 430 and that is joined to conductive member 430 by swaging.

It should be noted that below-described matters can be also applied to a swaging joined portion (portion B in FIG. 9) of negative electrode terminal 500 to first negative electrode current collector 710.

The inner peripheral wall of the hole in which positive electrode terminal 400 is inserted has a first region 10, a second region 20, and a tapered region 30. First region 10, second region 20, and tapered region 30 are continuously formed. Swaging joined portion 400a of positive electrode terminal 400 is connected to conductive member 430 by welding at a welding portion 40.

First region 10 extends in an insertion direction of positive electrode terminal 400, that is, in a direction along the thickness direction of conductive member 430. Tapered region 30 is located on the electrode assembly 200 side with respect to first region 10. Tapered region 30 is formed such that the diameter of the hole is increased in the direction away from first region 10. Second region 20 is located between first region 10 and tapered region 30.

The thickness of conductive member 430 is, for example, approximately 1.0 mm. The thickness of first region 10 is preferably approximately more than or equal to 0.1 mm (approximately more than or equal to 10% of the thickness of conductive member 430), is more preferably approximately more than or equal to 0.2 mm and less than or equal to 0.6 mm (approximately more than or equal to 20% and less than or equal to 60% of the thickness of conductive member 430), and is approximately 0.3 mm (approximately 30% of the thickness of conductive member 430) in one example. By setting the thickness of first region 10 to fall within the above range, conductive member 430 can be stably positioned with respect to positive electrode terminal 400.

The width of second region 20 along the radial direction (leftward/rightward direction in FIG. 12) of the hole of conductive member 430 is preferably approximately more than or equal to 0.01 mm, is more preferably approximately more than or equal to 0.02 mm, and is, for example, approximately 0.05 mm in one example.

As described below, second region 20 serves to improve fastening force for positive electrode terminal 400. By setting the width of second region 20 to fall within the above range, the fastening force for positive electrode terminal 400 can be effectively improved.

The width of tapered region 30 along the radial direction (leftward/rightward direction in FIG. 12) of the hole of conductive member 430 is preferably approximately more than or equal to 0.1 mm, is more preferably approximately more than or equal to 0.3 mm, and is approximately 0.4 mm in one example. By setting the width of tapered region 30 to fall within the above range, positive electrode terminal 400 can be fixed to conductive member 430 stably by swaging.

Thus, the width of second region 20 along the radial direction (leftward/rightward direction in FIG. 12) of the hole of conductive member 430 is smaller than the width of tapered region 30 along the radial direction (leftward/rightward direction in FIG. 12) of the hole of conductive member 430. Preferably, the width of second region 20 along the radial direction of the hole of conductive member 430 is approximately more than or equal to 1/40 and less than or equal to 1/20 of the width of tapered region 30 along the radial direction of the hole of conductive member 430.

The extending direction of second region 20 intersects the extending direction of first region 10 at an intersection angle θ2. Intersection angle θ2 is preferably approximately more than or equal to 60° and less than or equal to 120°, is more preferably approximately more than or equal to 80° and less than or equal to 100°, and is approximately 90° in one example.

The extending direction of tapered region 30 intersects the extending direction of first region 10 at an intersection angle θ1. Intersection angle θ1 is preferably more than or equal to 20° and less than or equal to 50°, is more preferably more than or equal to 25° and less than or equal to 45°, and is approximately 30° in one example.

Thus, the intersection angle (θ2 in the figure) of second region 20 with respect to first region 10 is larger than the intersection angle (θ1 in the figure) of tapered region 30 with respect to first region 10. Preferably, the intersection angle (θ2) of second region 20 with respect to first region 10 is larger than the intersection angle (θ1) of tapered region 30 with respect to first region 10 by approximately more than or equal to 40° and less than or equal to 70°.

Figure 13:
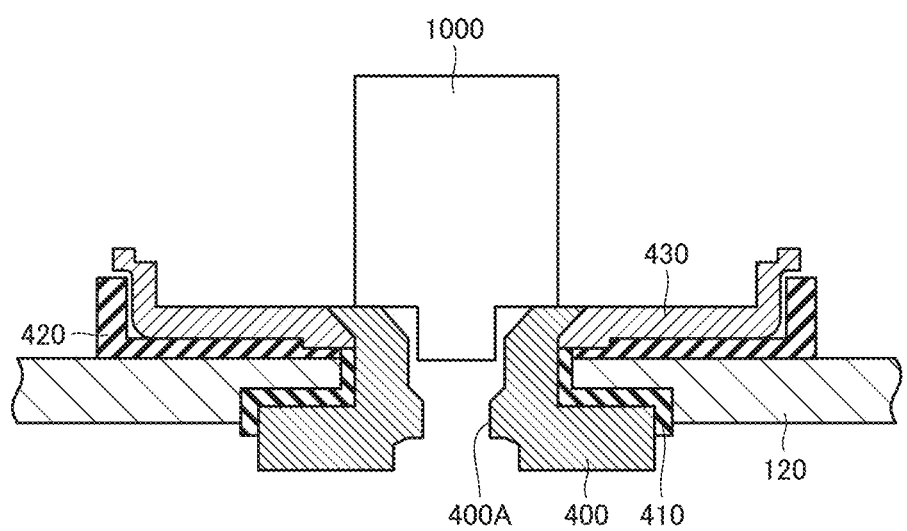
FIG. 13 is a diagram showing an apparatus for performing a pressing test to check strength of joining by swaging.

FIG. 13 is a diagram showing an apparatus for performing a pressing test to check strength of joining by swaging between positive electrode terminal 400 and conductive member 430. In the apparatus shown in FIG. 13, while pressing a jig 1000 to displace positive electrode terminal 400, a reaction force thereto is measured, thereby checking the strength of joining by swaging.

Figure 14:
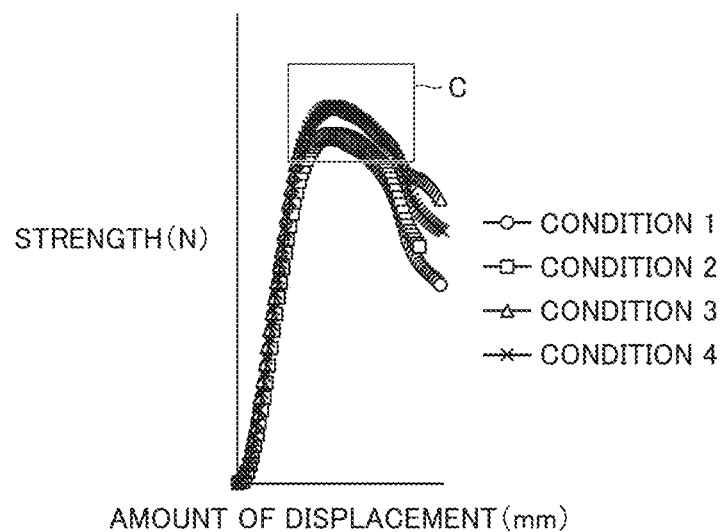
FIG. 14 is a diagram showing results of the pressing test performed using the apparatus shown in FIG. 13.
Figure 15:
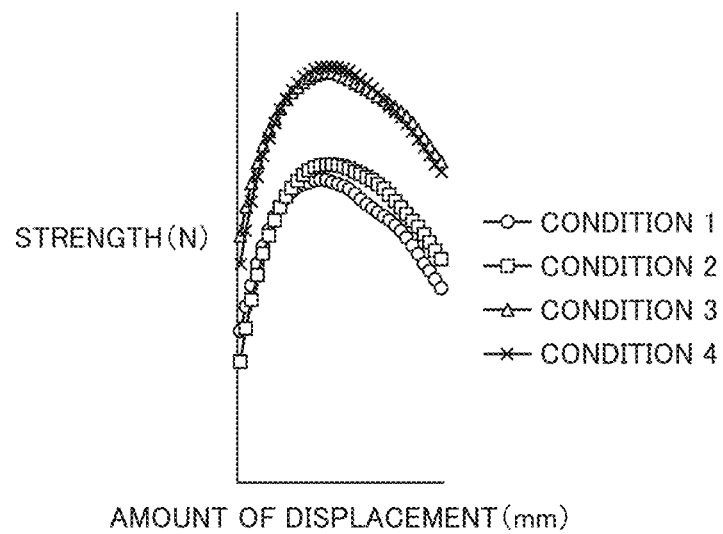
FIG. 15 is an enlarged view of part (part C in FIG. 14) of the test results shown in FIG. 14.

FIG. 14 is a diagram showing results of the pressing test performed using the apparatus shown in FIG. 13, and FIG. 15 is an enlarged view of part (part C in FIG. 14) of the test results shown in FIG. 14.

In FIGS. 14 and 15, "CONDITION 1" represents a case where no second region 20 is provided (first region 10 and tapered region 30 are continuous), "CONDITION 2" represents a case where the width of second region 20 along the radial direction of the hole of conductive member 430 is 1/40 of the width of tapered region 30 along the radial direction of the hole of conductive member 430, "CONDITION 3" represents a case where the above-described ratio is 1/20, and "CONDITION 4" represents a case where the above-described ratio is 1/8.

As shown in FIGS. 14 and 15, in the case of "CONDITION 2" to "CONDITION 4" in each of which second region 20 is provided, the strength of joining by swaging is improved as compared with the case of "CONDITION 1" in which no second region 20 is provided. Particularly, in the case of "CONDITION 3" (1/20) and "CONDITION 4" (1/8) in each of which the width of second region 20 is relatively large with respect to the width of tapered region 30, the strength of swaging is particularly effectively improved.

On the other hand, in the case of "CONDITION 4" in which the width of second region 20 with respect to the width of tapered region 30 is 1/8, closeness of contact between positive electrode terminal 400 and conductive member 430 can be slightly insufficient. Regarding this point, the strength of joining by swaging can be improved without the above concern in each of "CONDITION 2" and "CONDITION 3".

In order to improve the strength of joining by swaging between positive electrode terminal 400 and conductive member 430, it is also conceivable to increase the thickness of conductive member 430 and increase the thickness of swaging-joined portion 400a. However, the increased thickness of conductive member 430 may cause other problems, such as increased warpage of the member.

According to the structure of the present embodiment, the strength of swaging between positive electrode terminal 400 (negative electrode terminal 500) and conductive member 430 (first negative electrode current collector 710) can be improved without causing the above-described problem. Further, the swaging step does not become complicated by providing second region 20.

It is considered that examples of the material of each of the terminal member (positive electrode terminal 400 and negative electrode terminal 500) and the conductive member (conductive member 430 and first negative electrode current collector 710) include aluminum, an aluminum alloy, copper, a copper alloy, and the like. Further, a material obtained by providing nickel plating to each of these materials may be used, or a material having an aluminum-copper clad structure may be used.

Although the embodiments of the present invention have been described and illustrated in detail, it is clearly understood that the same is by way of illustration and example only and is not to be taken by way of limitation, the scope of the present invention being interpreted by the terms of the appended claims.

What is claimed is:
1. A battery comprising:
an electrode assembly;
a battery case that accommodates the electrode assembly;
a terminal member fixed to the battery case; and
a conductive member accommodated in the battery case,
the conductive member being provided with a connection hole into which the terminal member is inserted,
the conductive member being electrically connected to the electrode assembly, wherein
the terminal member includes a swaging-joined portion inserted in the connection hole and joined to the conductive member by swaging,
an inner peripheral wall of the connection hole of the conductive member includes
a first region along an insertion direction of the terminal member,
a tapered region located on the electrode assembly side with respect to the first region, the tapered region being a region in which a diameter of the connection hole is increased in a direction away from the first region, and
a second region located between the first region and the tapered region,
an intersection angle ($\theta 2$) of the second region with respect to the first region is larger than an intersection angle ($\theta 1$) of the tapered region with respect to the first region, and
a width of the second region along a radial direction of the connection hole is smaller than a width of the tapered region along the radial direction of the connection hole, wherein the intersection angle ($\theta 2$) of the second region with respect to the first region is larger than the intersection angle ($\theta 1$) of the tapered region with respect to the first region by more than or equal to 40° and less than or equal to 70°.

2. The battery according to claim 1, wherein the first region, the second region, and the tapered region are continuously formed.

3. A battery comprising:
an electrode assembly;
a battery case that accommodates the electrode assembly;
a terminal member fixed to the battery case; and
a conductive member accommodated in the battery case,
the conductive member being provided with a connection hole into which the terminal member is inserted,
the conductive member being electrically connected to the electrode assembly, wherein
the terminal member includes a swaging-joined portion inserted in the connection hole and joined to the conductive member by swaging,
an inner peripheral wall of the connection hole of the conductive member includes
a first region along an insertion direction of the terminal member,
a tapered region located on the electrode assembly side with respect to the first region, the tapered region being a region in which a diameter of the connection hole is increased in a direction away from the first region, and
a second region located between the first region and the tapered region,
an intersection angle ($\theta 2$) of the second region with respect to the first region is larger than an intersection angle ($\theta 1$) of the tapered region with respect to the first region, and
a width of the second region along a radial direction of the connection hole is smaller than a width of the tapered region along the radial direction of the connection hole, wherein the intersection angle ($\theta 2$) of the second region with respect to the first region is substantially 90°.

4. A battery comprising:
an electrode assembly;
a battery case that accommodates the electrode assembly;
a terminal member fixed to the battery case; and
a conductive member accommodated in the battery case,
the conductive member being provided with a connection hole into which the terminal member is inserted,
the conductive member being electrically connected to the electrode assembly, wherein
the terminal member includes a swaging-joined portion inserted in the connection hole and joined to the conductive member by swaging,
an inner peripheral wall of the connection hole of the conductive member includes
a first region along an insertion direction of the terminal member,
a tapered region located on the electrode assembly side with respect to the first region, the tapered region being a region in which a diameter of the connection hole is increased in a direction away from the first region, and a second region located between the first region and the tapered region, an intersection angle ($\theta 2$) of the second region with respect to the first region is larger than an intersection angle ($\theta 1$) of the tapered region with respect to the first region, and a width of the second region along a radial direction of the connection hole is smaller than a width of the tapered region along the radial direction of the connection hole, wherein the intersection angle ($\theta 1$) of the tapered region with respect to the first region is more than or equal to 20° and less than or equal to 50°.

5. The battery according to claim 1, wherein the width of the second region along the radial direction of the connection hole is more than or equal to 1/40 and less than or equal to 1/20 of the width of the tapered region along the radial direction of the connection hole.

6. The battery according to claim 1, wherein the swaging-joined portion of the terminal member is connected to the conductive member by welding.

7. The battery according to claim 3, wherein the first region, the second region, and the tapered region are continuously formed.

8. The battery according to claim 3, wherein the width of the second region along the radial direction of the connection hole is more than or equal to 1/40 and less than or equal to 1/20 of the width of the tapered region along the radial direction of the connection hole.

9. The battery according to claim 3, wherein the swaging-joined portion of the terminal member is connected to the conductive member by welding.

10. The battery according to claim 4, wherein the first region, the second region, and the tapered region are continuously formed.

11. The battery according to claim 4, wherein the width of the second region along the radial direction of the connection hole is more than or equal to 1/40 and less than or equal to 1/20 of the width of the tapered region along the radial direction of the connection hole.

12. The battery according to claim 4, wherein the swaging-joined portion of the terminal member is connected to the conductive member by welding.

* * * * *